US010136752B2

(12) United States Patent
Wu

(10) Patent No.: US 10,136,752 B2
(45) Date of Patent: Nov. 27, 2018

(54) CODE TRANSLATION PROGRAM FOR PRECISION SOUS VIDE COOKER DEVICE

(71) Applicant: ANOVA APPLIED ELECTRONICS, INC., San Francisco, CA (US)

(72) Inventor: Jeff Wu, Stafford, TX (US)

(73) Assignee: Anova Applied Electronics, Inc., San Francisco, CA (US)

( * ) Notice: Subject to any disclaimer, the term of this patent is extended or adjusted under 35 U.S.C. 154(b) by 0 days.

(21) Appl. No.: 14/727,402

(22) Filed: Jun. 1, 2015

(65) Prior Publication Data

US 2015/0342389 A1 Dec. 3, 2015

Related U.S. Application Data

(63) Continuation of application No. 14/491,961, filed on Sep. 19, 2014.
(Continued)

(51) Int. Cl.
| | |
|---|---|
| *A47J 36/00* | (2006.01) |
| *A47J 27/62* | (2006.01) |
| *A47J 27/10* | (2006.01) |
| *G05B 15/02* | (2006.01) |
| *G05D 23/19* | (2006.01) |
| *H05B 3/68* | (2006.01) |

(Continued)

(52) U.S. Cl.
CPC .............. *A47J 27/62* (2013.01); *A21B 7/005* (2013.01); *A23L 5/13* (2016.08); *A47J 27/10* (2013.01); *A47J 36/165* (2013.01); *A47J 37/1257* (2013.01); *A47J 37/1266* (2013.01); *A47J 43/044* (2013.01); *B01F 13/003* (2013.01); *F24C 3/085* (2013.01); *G05B 15/02* (2013.01); *G05D 23/1917* (2013.01); *H05B 3/68* (2013.01); *H05B 6/1209* (2013.01); *A47J 43/082* (2013.01); *B01F 13/002* (2013.01)

(58) Field of Classification Search
CPC .............................. A21B 7/005; A47J 36/165
USPC .......... 99/348, 403, 483, 330; 426/390, 496, 426/506, 509, 519
See application file for complete search history.

(56) References Cited

U.S. PATENT DOCUMENTS

| | | |
|---|---|---|
| 1,703,099 A | 2/1929 | Craddock |
| 1,864,149 A | 6/1932 | Rockwell |

(Continued)

FOREIGN PATENT DOCUMENTS

| | | |
|---|---|---|
| CN | 102192597 A | 9/2011 |
| CN | 103211494 A | 7/2013 |

(Continued)

OTHER PUBLICATIONS

Notification of Reason for Refusal dated Mar. 31, 2015; in Japanese patent application No. 2014-025539.
(Continued)

*Primary Examiner* — Reginald L Alexander
(74) *Attorney, Agent, or Firm* — RatnerPrestia

(57) ABSTRACT

A method for translating cooking time and temperatures for prepackaged food products. The sous-vide program allows users to cook to a food manufacturer recommended doneness based on the size, shape and fat content of the food. The program also lets user adjust setting if the users modified the food product like cut it in half. The program can be located on the sous vide cooking device or on person computing device.

19 Claims, 6 Drawing Sheets

Related U.S. Application Data

(60) Provisional application No. 62/005,860, filed on May 30, 2014, provisional application No. 61/880,714, filed on Sep. 20, 2013.

(51) Int. Cl.

| | | |
|---|---|---|
| H05B 6/12 | (2006.01) | |
| F24C 3/08 | (2006.01) | |
| A47J 36/16 | (2006.01) | |
| A47J 37/12 | (2006.01) | |
| A23L 5/10 | (2016.01) | |
| B01F 13/00 | (2006.01) | |
| A47J 43/044 | (2006.01) | |
| A21B 7/00 | (2006.01) | |
| A47J 43/08 | (2006.01) | |

(56) References Cited

U.S. PATENT DOCUMENTS

| | | | |
|---|---|---|---|
| 2,140,315 | A | 12/1938 | Dollinger |
| 3,114,154 | A | 12/1963 | Laughlin |
| 3,270,661 | A | 9/1966 | Alois |
| 3,273,717 | A | 9/1966 | Canterbury |
| D214,165 | S | 5/1969 | Sesholtz |
| 4,045,606 | A | 8/1977 | Kalkowski |
| 4,099,406 | A | 7/1978 | Fulkerson |
| 4,612,949 | A | 9/1986 | Henson |
| 4,817,217 | A | 4/1989 | Lively |
| 4,933,527 | A | 6/1990 | Edamura |
| 4,993,593 | A * | 2/1991 | Fabiano .............. A47J 36/16 219/442 |
| 5,146,840 | A * | 9/1992 | Hedenberg ............ A21B 7/005 206/219 |
| 5,317,134 | A | 5/1994 | Edamura |
| 5,321,229 | A | 6/1994 | Holling |
| 5,336,401 | A | 8/1994 | Tu |
| 5,368,384 | A | 11/1994 | Duncan |
| 5,372,422 | A * | 12/1994 | Dubroy ............... A47J 36/165 366/143 |
| 5,401,401 | A | 3/1995 | Hickok |
| 5,412,171 | A * | 5/1995 | Yahav .................. A47J 27/14 219/621 |
| 5,516,208 | A | 5/1996 | Givant |
| 5,542,344 | A | 8/1996 | Koether |
| 6,079,486 | A | 6/2000 | Cennamo |
| 6,113,258 | A | 9/2000 | Ardent |
| 6,286,990 | B1 | 9/2001 | De Zuazo Torres |
| 6,539,842 | B1 | 4/2003 | Chapman |
| 6,604,917 | B2 | 8/2003 | Casper |
| 6,763,879 | B1 | 7/2004 | Rozich et al. |
| 6,796,220 | B2 | 9/2004 | Lee |
| 6,962,290 | B2 * | 11/2005 | Kwon .................. A21B 7/005 235/462.01 |
| 7,026,929 | B1 | 4/2006 | Wallace |
| 8,087,822 | B2 | 1/2012 | Peng |
| 8,122,815 | B2 * | 2/2012 | Wolfe .................. A47J 36/165 219/389 |
| 8,172,451 | B2 * | 5/2012 | Li ....................... A47J 43/0705 366/129 |
| 8,218,402 | B2 | 7/2012 | Lewis |
| 8,469,678 | B2 | 6/2013 | Preston |
| 2004/0221736 | A1 * | 11/2004 | Park .................... A21B 7/005 99/348 |
| 2004/0223404 | A1 | 11/2004 | Hughes |
| 2005/0223910 | A1 | 10/2005 | Hankinson |
| 2006/0239113 | A1 | 10/2006 | Harris et al. |
| 2008/0000357 | A1 | 1/2008 | Yang et al. |
| 2008/0066624 | A1 | 3/2008 | Taylor |
| 2008/0136581 | A1 | 6/2008 | Heilman et al. |
| 2008/0218493 | A1 | 9/2008 | Patten et al. |
| 2008/0260557 | A1 | 10/2008 | Austin |
| 2009/0087534 | A1 | 4/2009 | McLemore |
| 2009/0093983 | A1 | 4/2009 | Trafford |
| 2009/0120301 | A1 * | 5/2009 | Severnak ............ A47J 27/004 99/331 |
| 2009/0153490 | A1 | 6/2009 | Nymark |
| 2010/0090656 | A1 | 4/2010 | Shearer et al. |
| 2010/0154656 | A1 | 6/2010 | Yamamoto |
| 2010/0199854 | A1 | 8/2010 | Homme |
| 2011/0070340 | A1 | 3/2011 | Pechaigner |
| 2011/0088564 | A1 | 4/2011 | Bonsell |
| 2011/0117259 | A1 | 5/2011 | Storek |
| 2011/0185915 | A1 | 8/2011 | Eades |
| 2011/0186283 | A1 | 8/2011 | Preston |
| 2011/0217439 | A1 | 9/2011 | Morandotti |
| 2012/0053747 | A1 | 3/2012 | Tanaka et al. |
| 2013/0091883 | A1 | 4/2013 | Perez et al. |
| 2013/0112683 | A1 | 5/2013 | Hegedis |
| 2013/0220143 | A1 | 8/2013 | Fetterman et al. |
| 2013/0302483 | A1 | 11/2013 | Riefenstein |
| 2014/0026762 | A1 | 1/2014 | Riefenstein |
| 2014/0208957 | A1 | 7/2014 | Imai |
| 2014/0260998 | A1 | 9/2014 | Pearson |
| 2014/0373723 | A1 | 12/2014 | Vestreli |
| 2015/0064314 | A1 | 3/2015 | Manuel |
| 2015/0257574 | A1 | 9/2015 | Hoare |
| 2015/0265090 | A1 | 9/2015 | Pennella |
| 2015/0289544 | A1 | 10/2015 | Mendonça Vilela Pinto Ferreira et al. |
| 2015/0335192 | A1 | 11/2015 | Plazarte |
| 2016/0083048 | A1 | 3/2016 | Munsch |
| 2016/0198883 | A1 | 7/2016 | Wang |

FOREIGN PATENT DOCUMENTS

| | | |
|---|---|---|
| EP | 2354738 | 8/2011 |
| EP | 2407703 | 1/2012 |
| GB | 2260002 | 3/1993 |
| JP | S63196984 U | 12/1988 |
| JP | 2006334208 | 12/2006 |
| JP | 2008043502 | 2/2008 |
| KR | 20120049118 | 5/2012 |
| WO | 0152478 | 7/2001 |
| WO | 2004008923 | 1/2004 |
| WO | 2012156890 | 11/2012 |
| WO | 2014019018 A1 | 2/2014 |

OTHER PUBLICATIONS

English abstract for JP2006334208; published Dec. 14, 2006.
English abstract for JP2008043502; published Feb. 28, 2008.
Extended European Search Report; European Application No. 15170175.2; dated Sep. 21, 2015.
Australian Examination Report for Australian Application No. 2014293183.dated Oct. 4, 2017, 3 pages.
Notice of Allowance for U.S. Appl. No. 14/727,431, dated Sep. 29, 2017, 8 pages.
Non Final Office Action for U.S. Appl. No. 14/491,961, dated Sep. 1, 2017, 10 pages.
Final Office Action for U.S. Appl. No. 14/865,845, dated Aug. 16, 2017, 10 pages.
Chinese Office Action for Chinese Application No. 201480051964.7, dated Sep. 25, 2017, 11 pages.
Notice of Allowance for U.S. Appl. No. 14/727,444, dated Sep. 5, 2017, 5 pages.
Notice of Allowance for U.S. Appl. No. 14/727,431, dated Feb. 14, 2018, 9 pages.
Chinese Office Action for Chinese Application No. 201510293958.9, dated Apr. 25, 2018, including English translation, 10 pages.
Australian Examination Report for Australian Application No. 2014200334, dated Mar. 20, 2018, 4 pages.
Extended European Search Report dated Sep. 24, 2015, European Application No. 15170165.3, 5 pages.
Notice of Allowance for U.S. Appl. No. 14/491,961, dated Jan. 22, 2018, 10 pages.
Extended European Search Report for European Application No. 15170168.8, dated Sep. 23, 2015, 4 pages.
Extended European Search For European Application No. 15170176.0, dated Sep. 21, 2015, 5 pages.

(56) References Cited

OTHER PUBLICATIONS

Non Final Office Action for U.S. Appl. No. 14/491,961, dated Apr. 10, 2018, 8 pages.
European Communication for European Application No. 15192763.9, dated Mar. 23, 2018, 4 pages.
International Search Report and Written Opinion of the International Searching Authority for International Application No. PCT/US2014/047838, dated Jan. 21, 2015.
J. Kenji Lopez-Alt: "Is The Nomiku Portable Sopus-Vide Cooker The Solution We're Looking For?", Serious Eats, Jun. 28, 2012; 2 pages, downloaded at http://www/seriouseats.com/2012/06/is-the-nomiku-portable-sous-vide-cooker-the-s.html.
News Anova INc. Water Bath Company, May 7, 2014, 1 page, downloaded at http://www.waterbaths.com/news.html.
Studio Kitchen; "Anova Immersion Circulator", May 8, 2014, 8 pp, downloaded at http//www.studiokitchen.com/studio-kitchen/anova-immersion-circulator.
European Patent Office Extended Search Report dated May 14, 2014, for European Patent Application No. EP 14154528.2, 8 pages.
European Communication Pursuant to Article 94(3) EPC for European Application No. 15170175.2, dated Jun. 8, 2018, 6 pages.
Notice of Allowance for U.S. Appl. No. 14/727,431, dated Jun. 1, 2018, 8 pages.
Notice of Allowance for U.S. Appl. No. 14/727,444, dated May 22, 2018, 7 pages.
Final Office Action for U.S. Appl. No. 14/491,961, dated Jul. 16, 2018, 8 pages.
Non Final Office Action for U.S. Appl. No. 14/885,845, dated Aug. 27, 2018, 33 pages.
Chinese Office Action for Chinese Application No. 201510293958.9, dated Aug. 10, 2018 with translation, 8 pages.
Non Final Office Action for U.S. Appl. No. 14/907,533, dated Aug. 9, 2018, 24 pages.
Non Final Office Action for U.S. Appl. No. 15/690,439, dated Aug. 9, 2018, 12 pages.

* cited by examiner

CODE TRANSLATION PROGRAM FOR PRECISION SOUS VIDE COOKER DEVICE

CROSS-REFERENCE TO RELATED APPLICATIONS

This application is a continuation-in-part of U.S. application Ser. No. 14/491,961, filed on Sep. 19, 2014, which application claims the benefit of U.S. Provisional Application No. 61/880,714, filed Sep. 20, 2013. This application also claims the benefit of U.S. provisional application No. 62/005,860, filed on May 30, 2014. The contents of all of the foregoing applications are entirely incorporated by reference herein.

FIELD OF TECHNOLOGY

The present disclosure relates generally to food cooking devices, and more specifically, to precision temperature control water bath heaters and water pumping heating circulator appliances for cooking food in water.

BACKGROUND

Sous-vide is a method of cooking food in highly precise temperature environment in a water bath for longer than normal cooking times at an accurately regulated temperature much lower than normally used for cooking, typically around 55° C. (113° F.) to 85° C. (185° F.) for meats and higher for vegetables.

However sous vide cooking results vary by the temperature, time and fat/protein contents of foods. It is problematic for many dishes because the foods purchased from the grocery store have a wide variety of quality and fat content on top of the fact that there are a numerous temperature recipes for sous-vide that are unverified online leading to incorrect cook times and temperatures resulting in less than optimal results.

BRIEF DESCRIPTION OF THE DRAWINGS

In order to describe a manner in which features of the disclosure can be obtained, reference is made to specific embodiments that are illustrated in the appended drawings. Based on an understanding that these drawings depict only example embodiments of the disclosure and are not intended to be limiting of scope, the principles herein are described and explained with additional specificity and detail through the use of the accompanying drawings in which.

DETAILED DESCRIPTION

Figure 1:
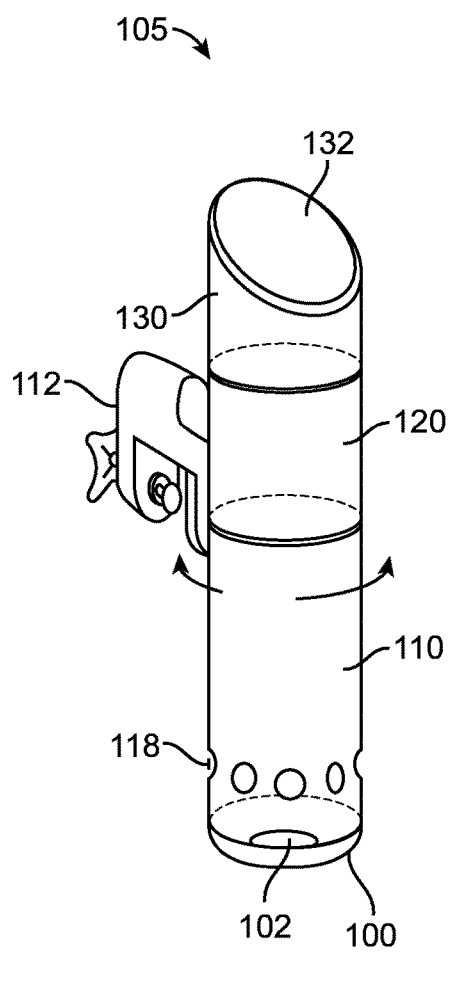
FIG. 1 illustrates a fluidic temperature control device in accordance with an example embodiment.

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

Several definitions that apply throughout this document will now be presented. "Circulating" means agitating, blending or mixing of one or more fluids. Hence a "circulator" is a device which can be configured to agitate, pump, air pump, blend or mix a fluid. Fluids will be understood to comprise liquids. "Coupled" is defined as connected, whether directly or indirectly through intervening components and is not necessarily limited to physical connections. Coupled devices are devices which are in signal communication with one another. "Connected" means directly connected or indirectly connected. "Sealed" can mean hermetically sealed, mechanically sealed or to make imperious to air and fluid.

Broadly speaking, this disclosure relates to sous-vide circulator cookers and cooking ranges for home sous-vide cooking. The disclosed devices are particularly suited for use in home kitchens, however, the devices are not limited to home kitchens and can be used in commercial environments.

The terms sous-vide, circulator, circulator cooker, fluidic temperature control device, and cooker are used interchangeably throughout this specification and each refers to a device configured to cook food in temperature controlled water bath.

In at least one embodiment, a fluidic temperature control device can have one or more turn-able or rotatable information displays. The display can be located on the top the cooker and can be configured to keep electronics housed therein away from steam, water and heat and to enable easy viewing from a plurality of different angles.

In at least one embodiment, a fluidic temperature control device can include a detachable skirt which enables cleaning of the skirt and cleaning of a heater, air pump, and/or water pump covered by the skirt. In at least one embodiment, the removable skirt can also expose the water pump impellers enabling a user to clean out food and debris. In at least one embodiment the skirt can be removed without tools. In at least one embodiment the skirt can be stainless steel, aluminum and/or plastic.

In at least one embodiment a fluidic temperature control device can have a water proof submersible pump in which the motor can be located under water, at the water line, or above water, with inflow and outflow lines. In at least one embodiment, the submersible pump can also be opened and/or accessed without tools for cleaning. In at least one embodiment, the fluidic temperature control device can be configured such that one or more motors of the device can be easily removed for cleaning or replacement.

In another embodiment, the entire circulator system can be sealed and can be submersed into water whether purposely or by accident, without damaging any components of the circulator system.

In at least one embodiment, a fluidic temperature control device can include a housing that defines the shape or form of the device. The housing can internally enclose and support various electrical components (for example, motors, fans, and/or electronics). In at least one embodiment, the housing can be cylindrical. In another embodiment, the housing can be a shape other than cylindrical, for example, rectangular, circular, square, or oval.

In at least one embodiment, a fluidic temperature control device for sous-vide cooking can include an upper portion including a controller, a display device and an input device coupled to the controller; a middle portion connected to the upper portion, the middle portion housing a motor coupled to the controller; a lower portion connected to the middle portion, the lower portion housing a fluid agitation device coupled to the motor, a heating element coupled to the controller, and the lower portion configured for at least partial immersion in a fluid. In at least one embodiment, the controller can be located in a cooking range. In at least one embodiment, the heating element is located in a cooking range.

In at least one embodiment, a fluidic temperature control device can include a clamp that enables an operator to secure the fluidic temperature control device to a container. In at least one embodiment, the clamp or other securement device can be configured to enable the height of the cooker to be adjusted with respect to the water bath or the chamber containing the bath, (for example, a cooking pot). In at least one embodiment, the sous-vide cooker can have a ring clamp that enables an operator to turn the entire system to vector the pump output or to turn the system for better display viewing angle.

In at least one embodiment, components of a fluidic temperature control device can be controlled by a remote device, for example, a phone, a server, a tablet, a Personal Computer (PC) or other electronic device. The remote device can be wirelessly and communicatively coupled to the cooker, for example, by Wi-fi, Bluetooth, Near Field Communication (NFC), short-range wireless or other similar system capable of sending and receiving data. In at least one embodiment, the fluidic temperature control device or the remote device controlling the fluidic temperature control device can be configured to wirelessly transmit information about cooking operations, such as a warning that additional water is required in the chamber cooking the food, or an alert indicating that cooking has been completed. In at least one embodiment, a fluidic temperature control device can receive recipe specifications from the remote device. The specifications can then direct the cook time, water pump speed, and cook temperature of the device.

In at least one embodiment, the fluidic temperature control device can include a memory storage unit. The memory storage unit can be used to store information such as favorite recipes and cooking parameters for certain foods. In at least one embodiment, a fluidic temperature control device can store a plurality of recipe specifications and user generated data files. Users of the device can recall recipe specifications from an internal recipe book. In at least one embodiment, the sous-vide circulator cooker can categorize stored recipe specifications and generated data files which can be searchable.

In at least one embodiment, a fluidic temperature control device can be configured to communicate with a wireless thermometer which can be placed in a bag or other suitable container containing food being cooked by the cooker, proximate the food. A thermometer located proximate the food can enable the cooker to have extremely accurate information about the temperature of the food being cooked. Accurate information regarding food temperature can enhance the quality of the cooked food and can aid in ensuring the food is properly and thoroughly cooked (thereby ensuring food safety). In at least one embodiment, the wireless thermometer can be inductively rechargeable.

In at least one embodiment, a fluidic temperature control device can be constructed to protect electronic components of the device from environmental factors associated with cooking, for example, high temperatures, water, and steam. In at least one embodiment, one or more portions of the fluidic temperature control device can dynamically change color depending on operational state of the device. In at least one embodiment, the portions of the sealed housing are configured to change color and to provide information regarding an operational state of the device.

In at least one embodiment, the upper portion of the fluidic temperature control device can be configured to protect the controller, display device and input device from steam during use. In at least one embodiment, the agitation device can be an impeller, a propeller, a rotatable blade, a water pump or an air pump.

In at least one embodiment, the lower portion of the fluidic temperature control device or housing can be composed of at least stainless steel, aluminum or plastic, and is removable without tools. In at least one embodiment, the lower portion can contain slits or openings running along at least a portion of a length of the lower portion. In at least one embodiment, the lower portion can be removable from the middle portion and removal of the middle portion exposes the agitation device. In at least one embodiment, the upper portion of the fluidic temperature control device can be rotatable with respect to the middle portion.

In at least one embodiment, the heating element can be proximate the agitation device. Additionally, the heating element can be housed substantially within the agitation device. In at least one embodiment, the heating element can be located in a cooking range. In at least one embodiment, the controller can be configurable to control the temperature of the heating element. In at least one embodiment, the controller can be configurable to receive data inputted via the input device, the data comprising control commands to control the temperature of the heating element. In at least one embodiment, the controller can be located in the fluidic temperature control device. In at least one embodiment, the controller can be located in the cooking range. At least one embodiment of a fluidic temperature control device for sous-vide cooking can include an upper portion including a turn-able display and an input device coupled to the microprocessor controller; a middle portion connected to the upper portion, the middle portion housing a temperature controller controlled by the microprocessor; and a lower portion connected to the middle portion. The lower portion can house or encase a submersible fluid agitation device including impellers and motor, and a heating element coupled to the temperature controller, the lower portion configured for at least partial immersion in a fluid.

In at least one embodiment, the upper portion and middle portion can be sealed, thereby preventing water entry, thereby protecting electronics, the display and other electrical devices within the fluidic temperature control device. In at least one embodiment, the agitation device can be wholly or partially submersible. The agitation device can include a pump system having a motor and an impeller. The agitation device can also comprise a rotatable impeller blade. In at least one embodiment, the agitation device can also comprise a submersible pump.

In at least one embodiment, the lower portion can be configured to be removable from the middle portion such that removal of the lower portion exposes the agitation device and heaters. In at least one embodiment, the middle portion can have two adjustable electrodes that can sense the water level. In at least one embodiment, the lengths of the electrodes can be adjustable to enable detection of different water levels. In at least one embodiment, the electrodes can be configurable with attachments that enable adjustment of a length of the electrodes.

In at least one embodiment, the controller can be configurable to receive data inputted via the input device, the data comprising control commands to control the temperature of the heating element. In at least one embodiment, the temperature controller is configurable to control the temperature of the heating element. In at least one embodiment, the heating element is located proximate the agitation device. In at least one embodiment, the heating element is located in a cooking range.

At least one embodiment of a fluidic temperature control device can comprise a controller located in a sealed housing; a submersible pump connected to the sealed controller; adjustable electrodes to detect water level; and a ring clamp enabling the device to be turned.

In at least one embodiment, the entire device can be submersed in water without negatively impacting the operation of the system. In at least one embodiment, the submersible pump can be opened without tools to expose the impeller blades. In at least one embodiment, the submersible pump can include a barb located on the pump outlet containing a tube receiver.

Code can mean any type of coding system from barcode to alpha numeric codes to color/shape codes to QR codes just to name a few.

A method within this disclosure can comprise receiving, at a fluidic temperature control device, a machine-readable code, translating, at the fluidic temperature control device, the machine-readable code into one or more cooking attributes; determining, at the fluid temperature control device, a temperature and cook time based on the one or more cooking attributes; and configuring the fluid temperature control device automatically according to the temperature and the cook time.

In at least one embodiment, the method further comprising receiving, at the fluid temperature control device, supplemental cooking attributes, receiving, at the fluid temperature control device, a doneness level, determining, at the fluid temperature control device, a new temperature and a new cook time based on the one or more cooking attributes, the supplemental cooking attributes and the doneness level, configuring, the fluid temperature control device, to the new temperature and the new cook time. In at least one embodiment, further comprising, rendering, at a display of the fluidic temperature control, a notification of an unsafe cook time and temperature when the new cook time and the new temperatures are outsides a threshold safety value.

In at least one embodiment, rendering, at a display of the fluidic temperature control, a notification of an unsafe cook time and temperature when the cook time and the temperatures are outsides a threshold safety value.

In at least one embodiment the machine-readable code is a QR code. In at least one embodiment the machine-readable code is a 3D barcode.

In at least one embodiment rendering, at a display of the fluidic temperature control device, the cook time and the temperature.

In at least one embodiment a system can include a fluidic temperature control device including a processor 140, a memory 142, a display, a heating element, an optical reader 144, and an agitator. The memory can be coupled with the processor and configured to provide the processor with instructions, which when executed cause the processor to: read, by the optical reader, a machine-readable code 146; translate the machine-readable code into one or more cooking attributes; determine a temperature, speed, and cook time based on the one or more cooking attributes; and configure automatically, the heating element to the temperature, the agitator to the speed and the display to the cook time.

In at least one embodiment, a system can be configured to: receive supplemental cooking attributes and a doneness level; determine a new temperature and a new cook time based on the one or more cooking attributes, the supplemental cooking attributes and the doneness level; configure the heating element to the temperature, the agitator to the speed and the display to the cook time. In at least one embodiment, the system can render, at the display, a notification of an unsafe cook time and temperature when the new cook time and the new temperatures are outsides a threshold safety value.

In at least one embodiment, a system can render, at the display, a notification of an unsafe cook time and temperature when the cook time and the temperatures are outsides a threshold safety value.

In at least one embodiment the machine-readable code is a QR code. In at least one embodiment the machine-readable code is a 3D barcode.

In at least one embodiment a system can render, at the display, the cook time and the temperature.

In at least one embodiment, a system can include a fluidic temperature control device including a processor, a memory, a display, a heating element, wireless receiver and an agitator; the memory coupled with the processor, wherein the memory is configured to provide the processor with instructions which when executed cause the processor to receiving, by the wireless receiver, a machine-readable code; translate the machine-readable code into one or more cooking attributes; determine a temperature, speed, and cook time based on the one or more cooking attributes; configure automatically, the heating element to the temperature, the agitator to the speed and the display to the cook time.

Figure 2:
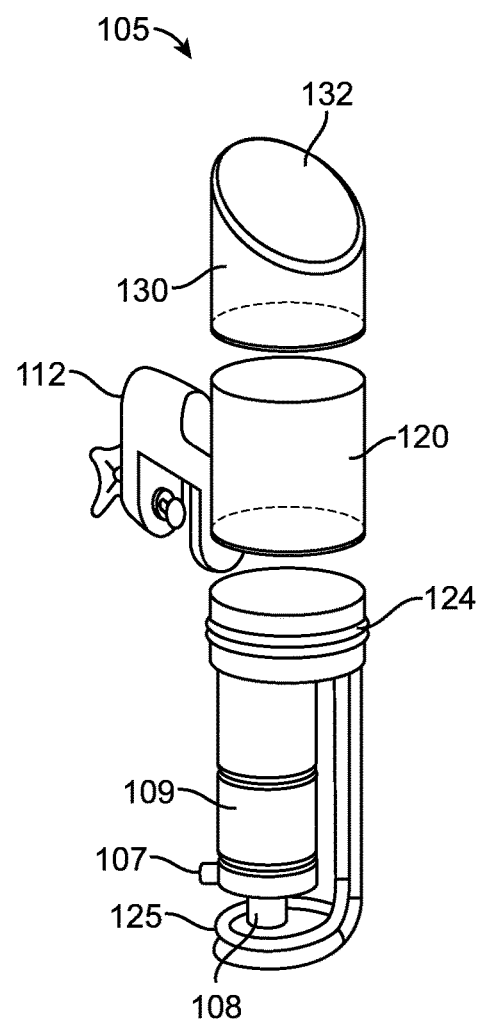
FIG. 2 illustrates a fluidic temperature control device in accordance with an example embodiment.

FIGS. 1 and 2 illustrate an example embodiment of a fluidic temperature control device 105. The temperature control device 105 comprises an upper portion 130, a middle portion 120 and a lower portion 110. In at least one embodiment, a fluidic temperature control device can include two portions: an upper and a lower. In at least embodiment, a fluidic temperature control device can include one portion. In at least one embodiment, a fluidic temperature control device can include one or more portions. The upper portion 130 can include a display device 132 which can display information, for example, the temperature of the fluid in which the lower portion 110 is at least partially immersed, the throughput at which intake and ejection ports are operating, or the speed at which an impeller housed within the lower portion is spinning. The upper portion 130 can also include an input device (not shown), for example, one or more buttons or controls which can enable a user to select a temperature for the water in which the lower portion is at least partially immersed. In at least one embodiment, the input device can include physical buttons and/or virtual buttons rendered on display device 132. The buttons or input controls can include capacitive sensor pads. The middle portion 120 can comprise a ring clamp 112 enabling attachment of control device 105 to a container, or the like. Middle portion 120 can include housing 124 for motor and heater base (not shown). Lower portion 110 can be configured with a cap 100 configured with one or more openings 102. Lower portion 110 can enclose submersible pump 109 with one or more liquid intake ports 107 and ejection ports 108. Alternatively, ports 108 can be fluid ejection ports and ports 107 can be fluid intake ports. The lower portion 110 can be configured with liquid intake (flow-in) openings 118 through which the heated water can be drawn by submersible pump 109, an impeller or other agitation device located within the lower portion 110 and ejected out of lower portion 110 through liquid ejection (flow-out) openings 102. Alternatively, openings 118 can be liquid output (flow-out) openings and openings 102 can be liquid intake (flow-in) openings. The lower portion 110 can included a thermometer device for taking the temperature of the fluid in which it is immersed. In another embodiment the thermometer can be separate device 105 and in wireless communication with device 105.

Figure 3:
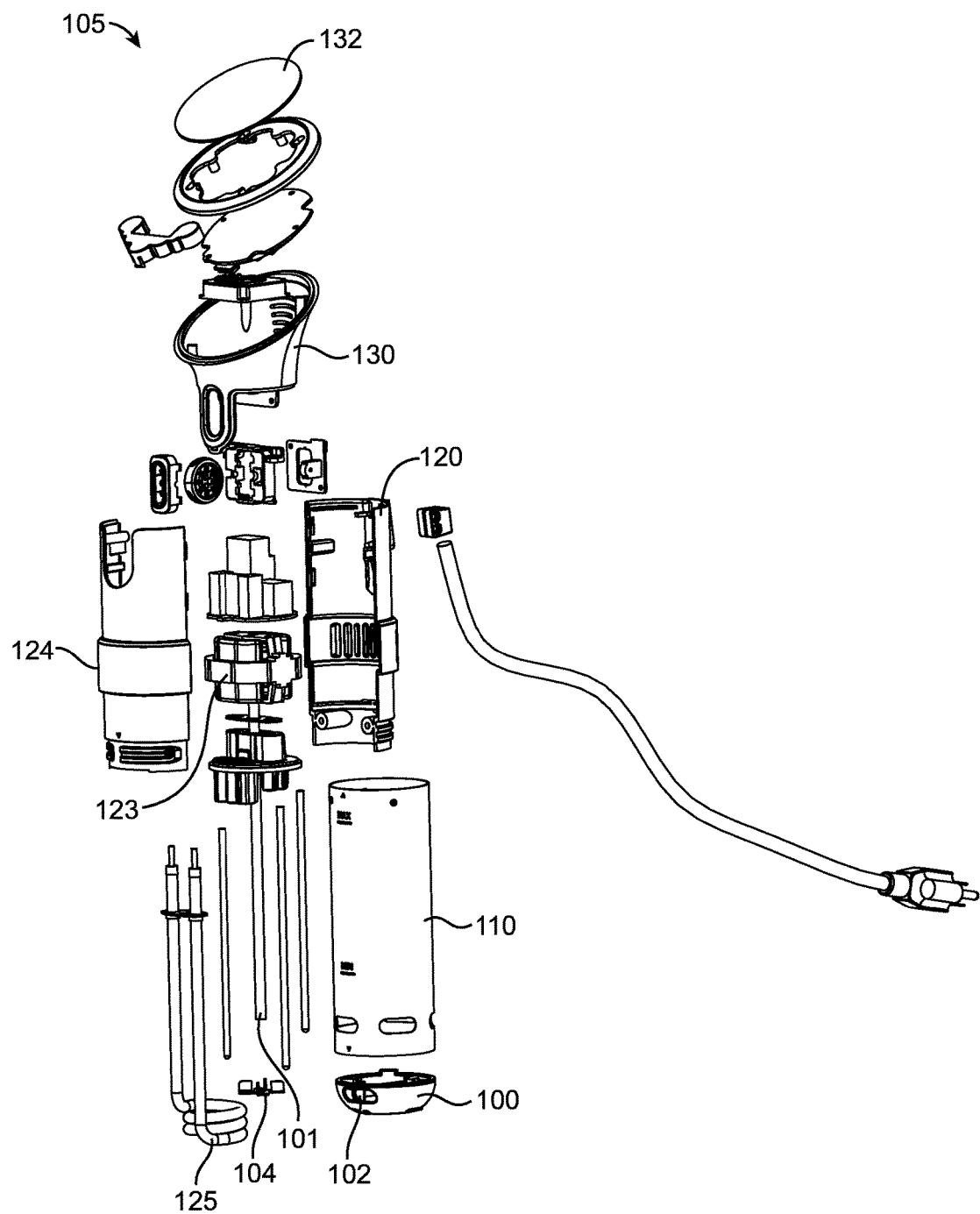
FIG. 3 illustrates a fluidic temperature control device in accordance with an example embodiment.

FIG. 3 illustrates components of at least one embodiment of a fluidic temperature control device 105. The device can include a lower portion 110. The lower portion 110 can be a removable, tool-less screw or clamp-on circulator pump other agitation device housing. Lower portion 110 can include heaters 125, drive shaft 101 and impeller 104. The lower portion 110 can be composed of stainless steel or other suitable materials. In one embodiment, the lower portion 110 can be a removable clamp-on on skirt. The lower portion 110 can be configured with one or more liquid intake (flow-in) openings 118. Alternatively, openings 118 can be liquid output (flow-out) openings. The device 105 can also include a liquid ejection (flow-out) cap 100 with one or more openings 102 on the side or bottom at the through which fluid can pass (as liquid intake (flow-in) or liquid output (flow-out)). Middle portion 120 can enclose motor and heater base 123 connected to electric heaters 125. Middle portion 120 can also comprise a fan (not shown) to blow out any steam that may be present. Middle portion 120 can include collar 124 including one or more openings to provide ventilation to motor and heater base 123. Device 105 can include an upper portion 130. The upper portion 130 can include a LCD display 132 with touch controls. Device 105 can be sealed against water/air and can be fully submersed for periods of time in the cooking vessel containing the fluid being heated by the device.

Figure 4:
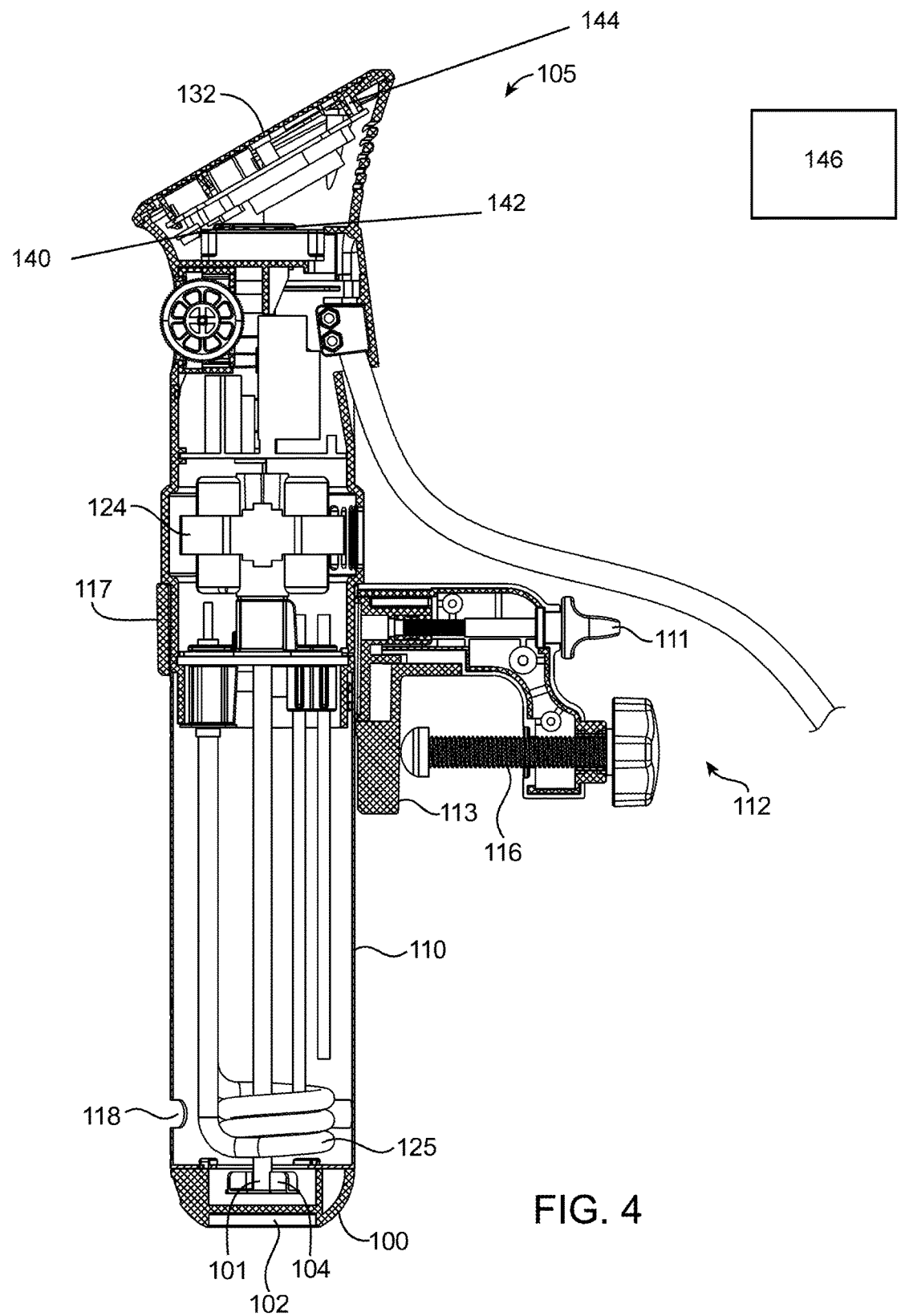
FIG. 4 is a cross-sectional view illustrating a fluidic temperature control device in accordance with an example embodiment.

FIG. 4 is a cross-sectional view illustrating an example embodiment of fluidic temperature control device 105 having a clamp 112. The clamp 112 can be configured to releasably secure the fluidic temperature control device 105 to a pot, or any container holding a fluid. The clamp 112 can have a collar 117 and an attachment portion 111 at the uppermost portion of the clamp. The collar 117 can circumferentially engage with device 105 by attachment portion 111. The attachment portion 111 can be spring operated and configured to enable the clamp 112 to attach to the fluidic temperature control device 105. The clamp 112 can further have a stationary engagement portion 113 configured to engage an inner portion of a pot. The clamp 112 can further have a moveable engagement portion 116 configured to engage an outer portion of the pot thereby securing the fluidic temperature control device 105 to the pot. The collar 117 can be positioned at any point along the fluidic temperature control device 105 to enable adjustment in the length of the lower portion 110 that is immersed in fluid of container 114.

Figure 5:
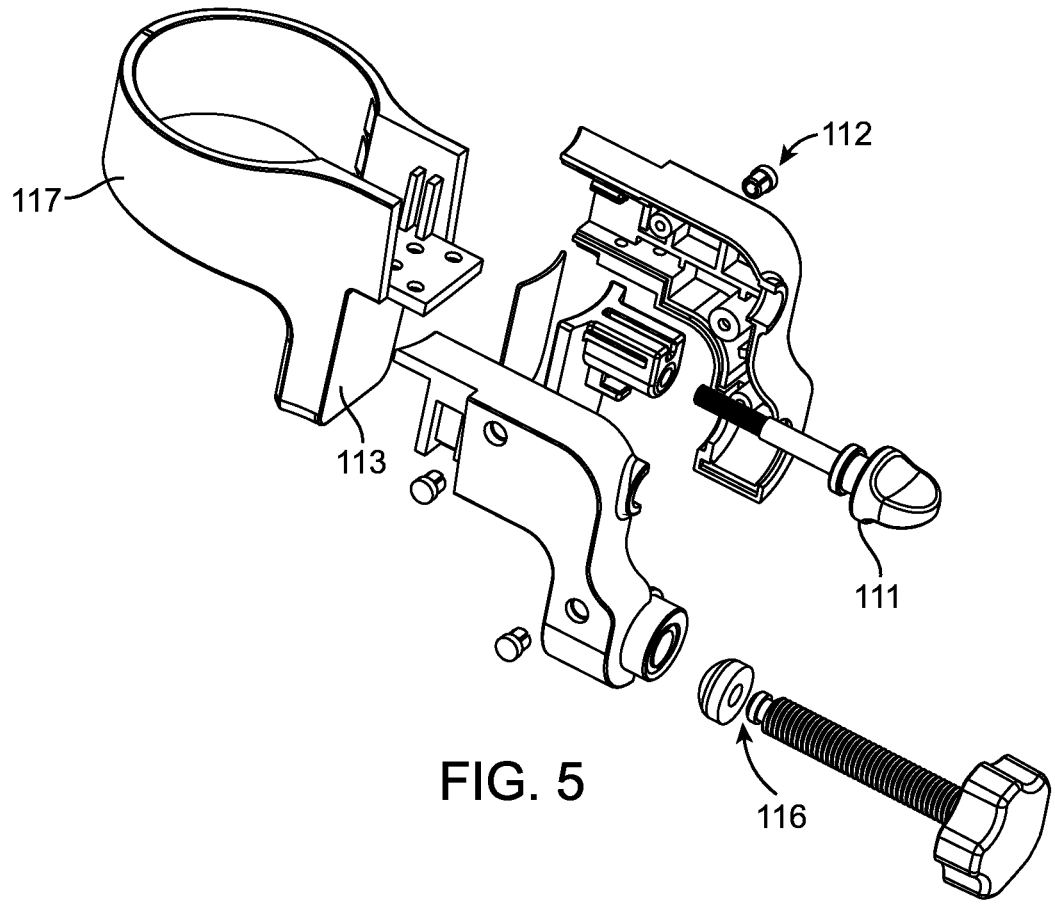
FIGS. 5-6 illustrates a clamping mechanism for a fluidic temperature control device in accordance with an example embodiment.
Figure 6:
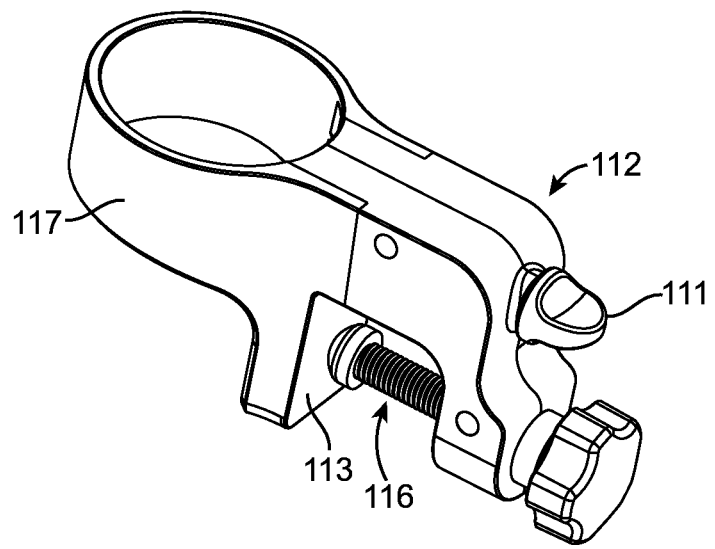

FIG. 5 and FIG. 6 illustrate an exploded view and assembled view of an example clamp 112 respectively. Clamp 112 can include a collar 117 to engage with a temperature control device (not shown). Collar 117 can be engaged by actuating attachment portion 111. Attachment portion 111 can be spring-loaded. When attachment portion 111 is actuated, collar 117 can be engaged with the temperature control device preventing movement of collar 117. Clamp 112 can also include a stationary engagement portion 113. Stationary engagement portion 113 can be configured to engage the inside wall of a container. Clamp 112 can also include a moveable engagement portion 116. Moveable engagement portion 116 can be configured to engage the outside wall of a container. Moveable engagement portion 116 can be actuated by a screw mechanism. In another embodiment, moveable engagement portion 116 can be spring-loaded.

Figure 7:
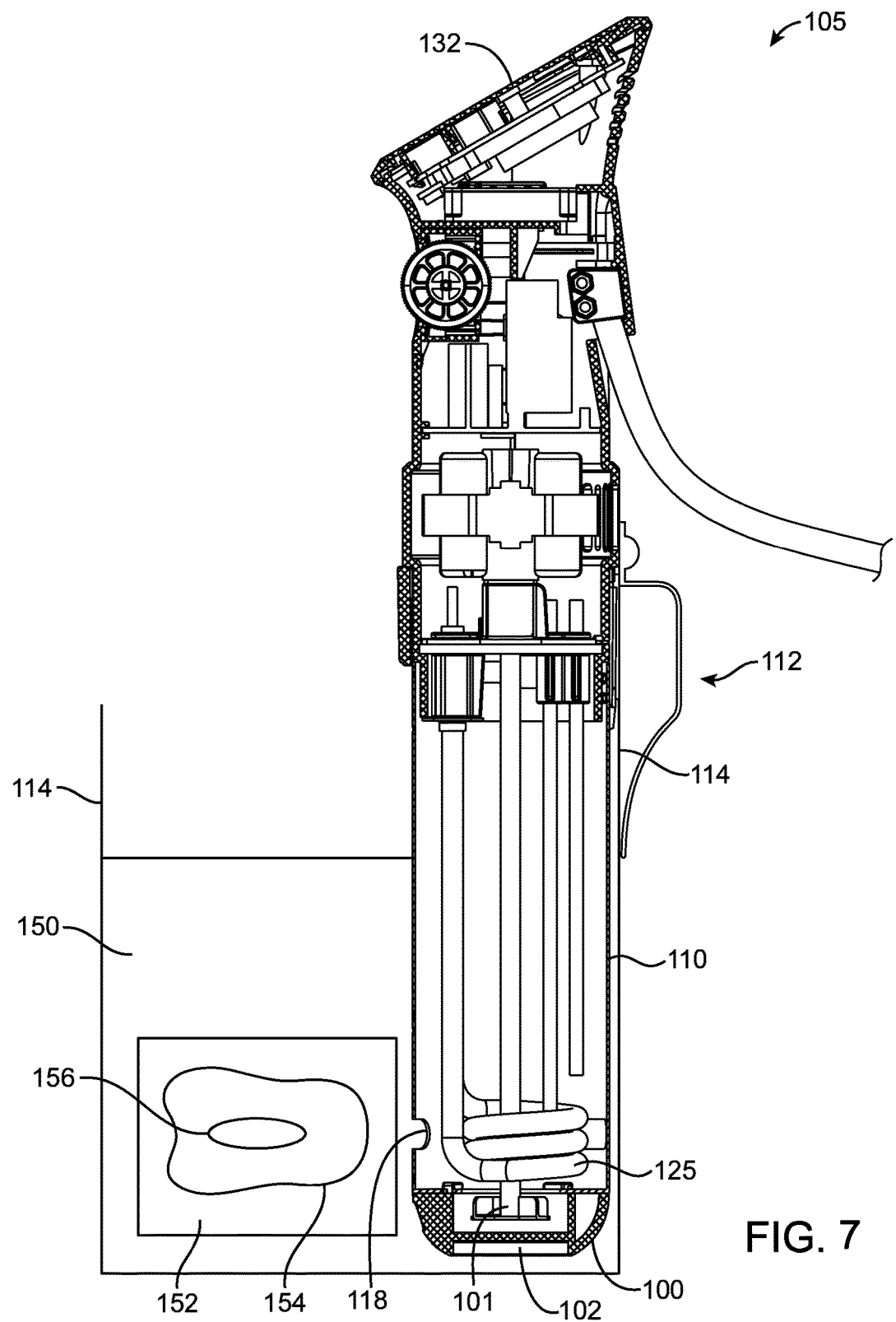
FIG. 7 is a cross-sectional view illustrating a fluidic temperature control device in accordance with an example embodiment.

FIG. 7 illustrates an example fluidic temperature control device in communication with a wireless temperature sensor. Device 105 is adjustably attached to container 114 containing fluid 150 (for example water). The temperature of fluid 150 can be regulated by device 105, as previously described. The wireless temperature sensor 156 can be placed proximate (or within) the food 154 within a sealed container 152 (for example, a plastic bag or plastic envelope) located in fluid 150. In another embodiment, the temperature sensor can be wired to and located at fluidic temperature control device 105.

Figure 8:
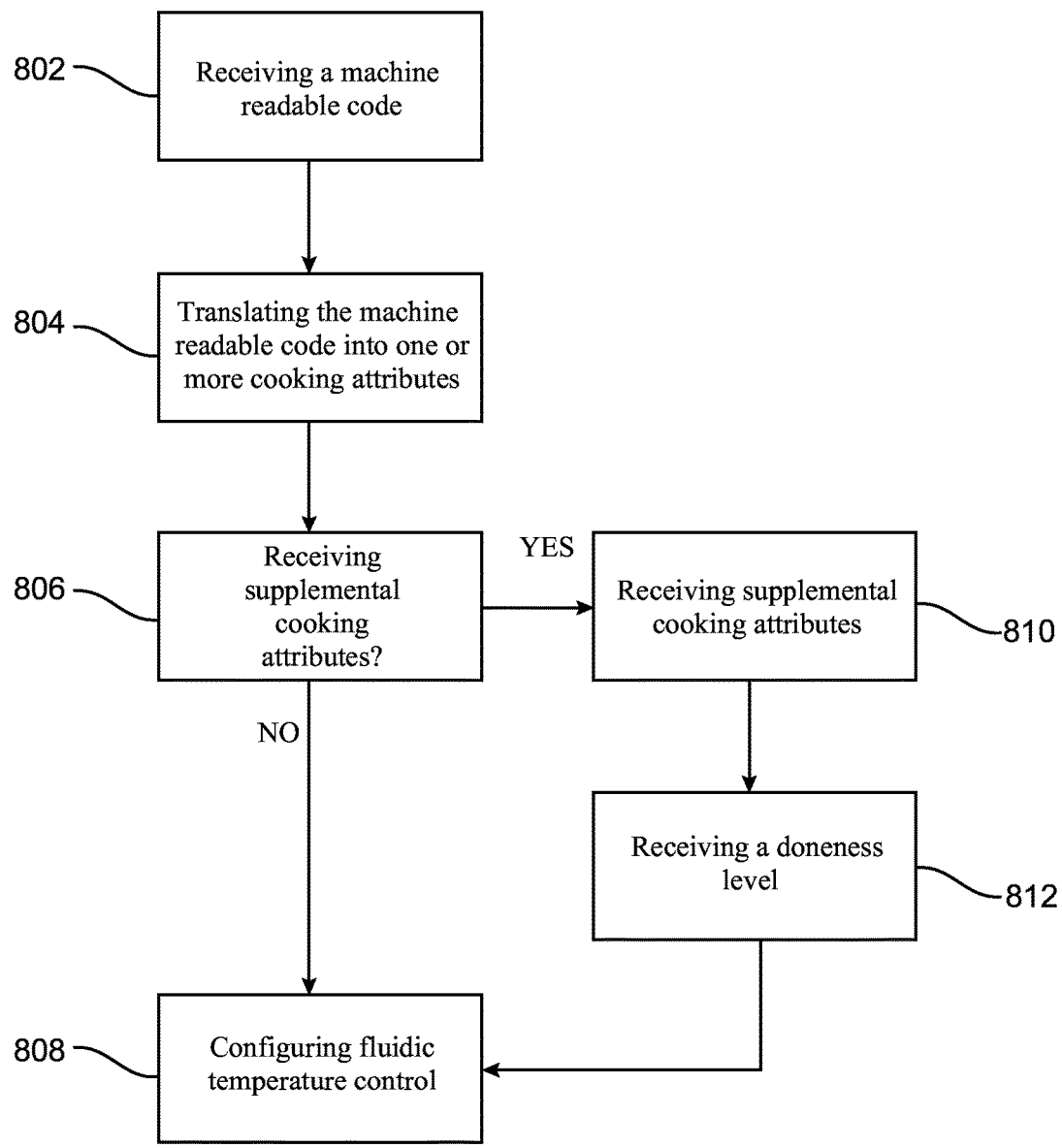
FIG. 8 illustrates a flowchart of an example method for generating cooking times and temperatures, in accordance with an example embodiment.

FIG. 8 is a flowchart of an example method for generating cooking times and temperatures. A method 800 is provided by way of example, as there are a variety of ways to carry out the method. The method 800 described below can be carried out using the configurations illustrated in at least FIGS. 1 and 7, for example, and various elements of these figures are referenced in explaining example method 800. The method of FIG. 8 is provided by way of example, as there are a variety of ways to carry out the method. Additionally, while the example method 800 is illustrated with a particular order of steps, those of ordinary skill in the art will appreciate that FIG. 8 and the steps illustrated therein can be executed in any order that accomplishes the technical advantages of the present disclosure and can include fewer or more steps than illustrated.

Each block shown in FIG. 8 can represent one or more processes, methods or subroutines, carried out in example method 800. The steps illustrated in FIG. 8 can be implemented in the device 105 illustrated in at least FIGS. 1 and 7. Additionally, those of ordinary skill in the art will appreciate that the steps illustrated in FIG. 8 can include instructions of processes stored in a non-transitory computer readable medium communicatively coupled to at least device 105. For purposes of illustration, FIG. 8 will be described from the perspective of the device 105.

Method 800 can begin at block 802. At block 802, a fluidic temperature control device for sous-vide cooking can receive a machine-readable code. For example, alpha numeric codes, QR codes, a 2D barcode, a 3D barcode, or any type of barcode or coding system. In one embodiment, the machine-readable code can include cooking times, cooking temperatures, a thickness, a fat content, a size, a weight, or a shape for a related packaged food. In at least one embodiment, the information in the machine-readable code can be supplemented (as shown in block 810-812). In at least one embodiment, the machine-readable code can be received from a camera, scanner or optical reader integrated in the fluidic temperature control device and configured to read machine-readable codes. In at least one embodiment, fluidic temperature control device can receive the machine-readable code wirelessly, for example, from a smartphone, tablet, computer, barcode scanner, QR code scanner, optical reader, or any computing device, peripheral device and/or combination thereof capability of reading a machine-readable code and transmitting the machine-readable code. In at least one embodiment, fluidic temperature control device can receive the machine-readable code by a wired connection. After a fluidic temperature control device for sous-vide cooking receives a machine-readable code at block 802, the method can move to block 804.

At block 804, the fluidic temperature control device can translate the machine-readable code into one or more cooking attributes. For example, a cooking time, cooking temperature, a thickness, a fat content, a size, a weight, or a shape relating to the packaged food. In at least one embodiment, one or more cooking time, cooking temperature, a thickness, a fat content, a size, a weight, or a shape of food can be translated. For example, the machine-readable code can be translated to a ribeye, with a temperature of 130 F. and cook time 1 hour. In another example, the machine-readable code can be translated to a pork shoulder, with a thickness of 5 inches, fat content of 10%, size of 8 lbs., cook time of 8 hours, and temperature of 120 F. In at least one embodiment, the information in the machine-readable code can be supplemented (as shown in block 810-812). In at least one embodiment, the fluidic temperature control device can render on a display the one or more cooking attributes for selection by a user. When the fluidic temperature control device has translated the machine-readable code into one or more cooking attributes at block 804, the method can move to block 806.

At block 806, a determination can be made if any supplemental cooking attributes were received. If one or more supplement cooking attributes were received at block 806, the method can proceed to block 810. If no supplemental cooking attributes were received at block 806, the method can proceed to block 808.

At block 808, the fluidic temperature control device can be configured for use. For example, a cook time can be rendered on the display and the heating controller can be configured for the cooking temperature. In at least one embodiment, fluidic temperature control device 105 can actuate the heating element to a specific degree Fahrenheit (or Celsius) and set a cook time in hours, minutes, and seconds. In at least one embodiment, the device is configured automatically on receipt of the machine-readable code. In at least one embodiment, the device is configured automatically after translation of the machine-readable code. In at least one embodiment, the device is configured upon selection of a cooking attribute. In at least one embodiment, the device can receive supplemental cooking attributes (as illustrated in blocks 810-812). In at least one embodiment the speed of the agitator is determined by the selections of at least one of the machine-readable code, a cooking attributes, or a doneness level. When the fluidic temperature control device can be configured for use at block 808 the method can end.

At block 810, the fluidic temperature control device can receive one or more supplemental cooking attributes. In at least one embodiment, the supplemental cooking attributes are received by a selection on a display of the device 105. In at least one embodiment, the selection can be made from a remote device, for example, a mobile phone, personal computer, tablet, or other device configured to connect wirelessly with device 105. The supplemental cooking attributes can be supplemental cook times, temperatures, a thickness, a fat content, a size, a weight, or a shape of food. The fluidic temperature control device 105 can store a plurality of pictures of the supplemental cooking attributes. In at least one embodiment one or more cooking attributes can be selected. The corresponding supplement cooking attributes can be combined with the cooking attributes translated from the machine-readable code in block 804 to determine the total cook time and total temperature for cooking. For example, the machine-readable can be ribeye, with a temperature of 130 F. and a cook time 1 hour, the supplemental cooking attributes can be a thickness of 2 inches, a weight of 2 lbs., temperature of 0 degrees and cook time of 2 hours. The total temperature and cook time can be 130 F. and 3 hours, respectively, based on these supplemental cooking attributes. When one or more supplemental cooking attributes are received at block 810, the method can move to block 812.

At block 812, the fluidic temperature control device can receive a doneness level. The doneness level can have associated cook times and temperatures. In at least one embodiment, the doneness level is received by a selection on a display of the device 105. In at least one embodiment, the selection can be made from a remote device, for example, a mobile phone, personal computer, tablet, or other device configured to connect wirelessly with device 105. The doneness levels can be well done, medium well, medium, medium rare, rare, blue, al dente, tender, soft, or firm. The fluidic temperature control device 105 can store a plurality of pictures of the doneness levels and corresponding supplemental cook time and temperatures. The associated cook times and temperatures for the selected doneness level can be combined with the cooking attributes translated from the machine-readable code in block 804, and/or the supplemental cooking attributes in block 810 to determine the total cook time and total temperature for cooking. For example, the cooking attribute translated from the machine-readable code can be ribeye, a thickness of 2 inches, the supplemental cooking attributes can be a weight of 2 lbs, and a doneness level of medium the associated temperature and cook time can be 0 degrees and cook times, respectively. The total cook time and temperature can be 130 F. and 2 hours. In another example, if the doneness level is well done the associated cook times can be 50 degrees and zero hours and the total temperature and cook time can be 180 F. and 3 hours, respectively. When a doneness level is received at block 810, the method can move to block 808.

In at least one embodiment, device 105 can display a notification on a display of the device of an unsafe time and temperature if cook time and temperatures are outside of a threshold of recommended safety zones.

The various embodiments herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various embodiments also can be implemented as part of at least one service or Web service, such as can be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Various embodiments utilize at least one network that would be familiar to those skilled in the art for supporting communications using any of a variety of commercially-available protocols, such as TCP/IP, OSI, FTP, UPnP, NFS, CIFS, and AppleTalk™. The network can be, for example, a local area network, a wide-area network, a virtual private network, the Internet, an intranet, an extranet, a public switched telephone network, an infrared network, a wireless network, and any suitable combination thereof.

In embodiments utilizing a Web server, the Web server can run any of a variety of server or mid-tier applications, including HTTP servers, FTP servers, CGI servers, data servers, Java servers, and business application servers. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, or TCL, as well as combinations thereof. The server(s) can also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network ("SAN") familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system can also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software can be via Internet download.

Based on the disclosure and teachings provided herein, it will be understood that other ways and methods of implementing the various embodiments described above are possible. The specification and drawings are illustrative and are not to be construed as limiting the scope of the following claims.

The invention claimed is:

1. A portable sous vide cooking device comprising:
   a processor, a memory, a display, a heating element, an optical reader, and an agitator;
   the memory coupled with the processor, wherein the memory is configured to provide the processor with instructions which when executed cause the processor to:
      read, by the optical reader, a machine-readable code;
      translate the machine-readable code into one or more cooking attributes;
      determine a temperature, speed, and cook time based on the one or more cooking attributes; and
      control automatically, the heating element to the determined temperature, the agitator to the determined speed to heat water in a container to the temperature, and the display to the determined cook time.

2. The device of claim 1, wherein the memory is further configured to provide the processor with instructions which when executed cause the processor to:
receive supplemental cooking attributes and a doneness level;
determine a new temperature and a new cook time based on the one or more cooking attributes, the supplemental cooking attributes and the doneness level; and
configure:
the heating element to the new temperature;
the agitator to the new speed to heat the water in the container to the new temperature; and
the display to the new cook time.

3. The device of claim 2, wherein the memory is further configured to provide the processor with instructions which when executed cause the processor to:
render, at the display, a notification of an unsafe cook time and temperature when the new cook time and the new temperatures are outside a threshold safety value.

4. The device of claim 1, wherein the memory is further configured to provide the processor with instructions which when executed cause the processor to:
render, at the display, a notification of an unsafe cook time and temperature when the cook time and the temperatures are outsides a threshold safety value.

5. The device of claim 1, wherein the machine-readable code is a QR code.

6. The device of claim 1, where the machine-readable code is a 3D barcode.

7. The device of claim 1, wherein the memory is further configured to provide the processor with instructions which when executed cause the processor to render, at the display, the cook time and the temperature.

8. A portable sous vide cooking system, comprising:
a processor, a memory, a heating element, a wireless receiver, an agitator, a display, and a housing configured to be at least partially submerged in a container of water;
the memory being coupled with the processor and configured to provide the processor with instructions which when executed cause the processor to:
receive, via the wireless receiver, a machine-readable code;
translate the machine-readable code into one or more cooking attributes;
determine a temperature, speed, and cook time based on the one or more cooking attributes;
automatically configure the heating element to the temperature and the agitator to the speed to heat the water in the container to the temperature, and the display according to the cook time; and
render, at the display, a notification of an unsafe cook time and temperature when the new cook time and the new temperature are outside a threshold safety value.

9. The system of claim 8, wherein the machine-readable code is received from a source external to the system.

10. A portable sous vide cooking device, comprising:
a processor;
a display device coupled to the processor;
a memory storing instructions;
a wireless receiver configured to receive inputs wirelessly;
a heating element; and
an agitator;
wherein the processor is coupled with the memory, the wireless receiver, the heating element and the agitator, wherein the processor is configured to access the instructions stored in the memory, and when executing the instructions the processor is configured to:
set a cook time and a temperature based upon cooking attributes obtained from an input including a translation of a machine-readable code received by the wireless receiver;
receive supplemental cooking attributes from the wireless receiver, wherein the supplemental cooking attributes include a new temperature;
in response to receiving the supplemental cooking attributes, change the set temperature to the new temperature;
automatically actuate the heating element to the new temperature;
automatically set a new cook time;
adjust a speed of the agitator to a speed to heat the water in the container to the new temperature; and
render, at the display device of the portable sous vide cooking device, a notification of an unsafe cook time and temperature when the new cook time and the new temperature are outside a threshold safety value.

11. The portable sous vide cooking device of claim 10, wherein the processor is further configured, upon execution of the instructions stored in the memory to:
control the display device to display to the new cook time.

12. A method comprising:
receiving, wirelessly at a portable sous vide cooking device a machine-readable code;
obtaining, by a processor at the portable sous vide cooking device, one or more cooking attributes from a translation of the machine-readable code;
determining, at the portable sous vide cooking device, a temperature and cook time based on the one or more cooking attributes;
configuring, the portable sous vide cooking device, to automatically actuate a heater and an agitator of the portable sous vide cooking device to heat water in a container to the temperature; and
rendering, at a display of the portable sous vide cooking device, a notification of an unsafe cook time and temperature when the cook time and the temperature are outside a threshold safety value.

13. The method of claim 12, further comprising:
receiving, at the portable sous vide cooking device, supplemental cooking attributes;
receiving, at the portable sous vide cooking device, a doneness level;
determining, at the portable sous vide cooking device, a new temperature and a new cook time based on the one or more cooking attributes, the supplemental cooking attributes and the doneness level; and
configuring, the portable sous vide cooking device, to the new temperature and the new cook time, wherein the configuring includes actuating the heater and the agitator of the portable sous vide cooking device.

14. The method of claim 13, further comprising:
rendering, at the display of the portable sous vide cooking device, a notification of an unsafe cook time and temperature when the new cook time and the new temperatures are outside a threshold safety value.

15. The method of claim 12, wherein the machine-readable code is a QR code.

16. The method of claim 12, wherein the machine-readable code is a 3D bar code.

17. The method of claim 12, further comprising:
rendering, at the display of the portable sous vide cooking device, the cook time and the temperature.

18. The method of claim 12, wherein the machine-readable code is received from a device external to the portable sous vide cooking device.

19. A method comprising:
receiving, wirelessly at a portable sous vide cooking device a machine-readable code;
obtaining, by a processor at the portable sous vide cooking device, one or more cooking attributes from a translation of the machine-readable code;
determining, at the portable sous vide cooking device, a temperature and cook time based on the one or more cooking attributes;
configuring, the portable sous vide cooking device, to automatically actuate a heater and an agitator of the portable sous vide cooking device to heat water in a container to the temperature;
receiving, at the portable sous vide cooking device, supplemental cooking attributes;
receiving, at the portable sous vide cooking device, a doneness level;
determining, at the portable sous vide cooking device, a new temperature and a new cook time based on the one or more cooking attributes, the supplemental cooking attributes and the doneness level;
configuring, the portable sous vide cooking device, to the new temperature and the new cook time, wherein the configuring includes actuating the heater and the agitator of the portable sous vide cooking device; and
rendering, at a display of the portable sous vide cooking device, a notification of an unsafe cook time and temperature when the new cook time and the new temperatures are outside a threshold safety value.

* * * * *